United States Patent
Lomax et al.

(10) Patent No.: US 7,939,953 B2
(45) Date of Patent: May 10, 2011

(54) MICRO SCALE FISCHER-TROPSCH AND OXYGENATE SYNTHESIS PROCESS STARTUP UNIT

(75) Inventors: Franklin D. Lomax, Boyds, MD (US); Maxim Lyubovsky, Alexandria, VA (US); Stephen C. LeViness, Tulsa, OK (US); Christopher P. Heinrichs, McLean, VA (US); Richard Shannon Todd, Springfield, VA (US)

(73) Assignee: Schlumberger Technology Corporation, Cambridge, MA (US)

( * ) Notice: Subject to any disclaimer, the term of this patent is extended or adjusted under 35 U.S.C. 154(b) by 461 days.

(21) Appl. No.: 12/104,161

(22) Filed: Apr. 16, 2008

(65) Prior Publication Data

US 2009/0261587 A1     Oct. 22, 2009

(51) Int. Cl.
*F02D 25/00*     (2006.01)
(52) U.S. Cl. ............................................. 290/4 A; 290/7
(58) Field of Classification Search ................ 290/7, 52, 290/1 A, 4 A, 4 D, 4 R; 322/44, 7; 60/670
See application file for complete search history.

(56) References Cited

U.S. PATENT DOCUMENTS

| | | | | |
|---|---|---|---|---|
| 1,394,807 A | * | 10/1921 | Blanchard | 431/28 |
| 2,222,152 A | * | 11/1940 | Newton | 290/30 B |
| 2,404,960 A | * | 7/1946 | Hanson et al. | 290/4 R |
| 2,504,768 A | * | 4/1950 | Watson et al. | 290/4 A |
| 3,047,724 A | * | 7/1962 | Neufville et al. | 290/4 R |
| 3,050,456 A | * | 8/1962 | Melchior | 208/67 |
| 3,073,964 A | * | 1/1963 | Csanady, Jr. | 290/4 R |
| 3,930,367 A | * | 1/1976 | Gasparoli | 60/39.182 |
| 4,039,846 A | * | 8/1977 | Vance | 290/4 R |
| 4,421,989 A | * | 12/1983 | Brannstrom | 290/40 R |
| 4,460,834 A | * | 7/1984 | Gottfried | 307/64 |
| 4,469,954 A | * | 9/1984 | Maehara | 290/1 A |
| 4,525,206 A | | 6/1985 | Soled et al. | |
| 4,585,798 A | | 4/1986 | Beuther et al. | |
| 4,605,676 A | | 8/1986 | Kobylinski et al. | |
| 4,605,679 A | | 8/1986 | Kobylinski et al. | |
| 4,607,020 A | | 8/1986 | Soled et al. | |
| 4,670,414 A | | 6/1987 | Kobylinski et al. | |
| 4,670,475 A | | 6/1987 | Mauldin | |
| 4,717,702 A | | 1/1988 | Beuther et al. | |
| 4,729,981 A | | 3/1988 | Kobylinski et al. | |
| 4,827,152 A | * | 5/1989 | Farkas | 307/68 |
| 4,857,497 A | | 8/1989 | De Jong et al. | |
| 4,863,894 A | | 9/1989 | Chinchen et al. | |
| 4,962,078 A | | 10/1990 | Behrmann et al. | |
| 4,967,096 A | * | 10/1990 | Diemer et al. | 307/19 |
| 5,581,128 A | * | 12/1996 | Royle | 290/4 D |

(Continued)

FOREIGN PATENT DOCUMENTS

WO     WO 02/097737     12/2002

(Continued)

*Primary Examiner* — Julio Gonzalez
(74) *Attorney, Agent, or Firm* — Helene Raybaud; James McAleenan; Brigid Laffey

(57) ABSTRACT

A mobile system for providing start-up electrical power to a micro scale liquid hydrocarbon and/or oxygenate synthesis plant is provided including a portable gas or liquid fueled electrical generator, a steam turbine, a plant generator mechanically coupled to the steam turbine, a plant power load; and means for synchronizing electrical power generated by the portable electrical generator with electrical power generated by the plant generator is provided. Also provided is a process for synchronizing electrical power generated by the portable electrical generator with electrical power generated by the plant generator.

13 Claims, 8 Drawing Sheets

U.S. PATENT DOCUMENTS

| | | |
|---|---|---|
| 5,585,316 A | 12/1996 | Nay et al. |
| 5,756,419 A | 5/1998 | Chaumette et al. |
| 5,928,985 A | 7/1999 | Williams |
| 6,005,011 A * | 12/1999 | Henningsen .................. 518/706 |
| 6,188,139 B1 * | 2/2001 | Thaxton et al. ............... 290/4 R |
| 6,706,661 B1 | 3/2004 | Krylova et al. |
| 6,716,886 B2 | 4/2004 | Krylova et al. |
| 6,753,351 B2 | 6/2004 | Koveal et al. |
| 6,815,388 B1 | 11/2004 | Ohlbach et al. |
| 6,871,504 B2 * | 3/2005 | Kuroki et al. ................... 60/797 |
| 7,102,331 B2 * | 9/2006 | Walter et al. ....................... 322/8 |
| 7,629,701 B2 * | 12/2009 | Campanile et al. ............. 290/2 |
| 7,669,418 B2 * | 3/2010 | Chino et al. .................... 60/645 |
| 2002/0077512 A1 | 6/2002 | Tendick et al. |
| 2003/0011196 A1 * | 1/2003 | Kern et al. .................... 290/1 A |
| 2004/0242941 A1 | 12/2004 | Green et al. |
| 2004/0245086 A1 | 12/2004 | Steynberg et al. |
| 2005/0250863 A1 | 11/2005 | Green et al. |
| 2007/0004810 A1 | 1/2007 | Wang et al. |
| 2007/0112080 A1 | 5/2007 | Green et al. |
| 2008/0245071 A1 * | 10/2008 | Kawakami et al. ............. 60/670 |

FOREIGN PATENT DOCUMENTS

| | | |
|---|---|---|
| WO | WO 2007/009951 | 1/2007 |
| WO | WO 2007/009965 | 1/2007 |

* cited by examiner

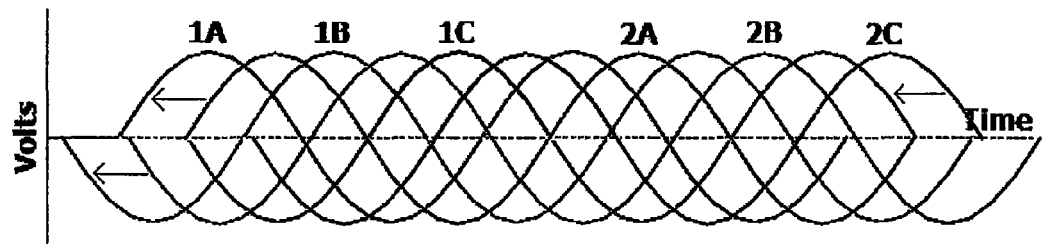
FIG. 5
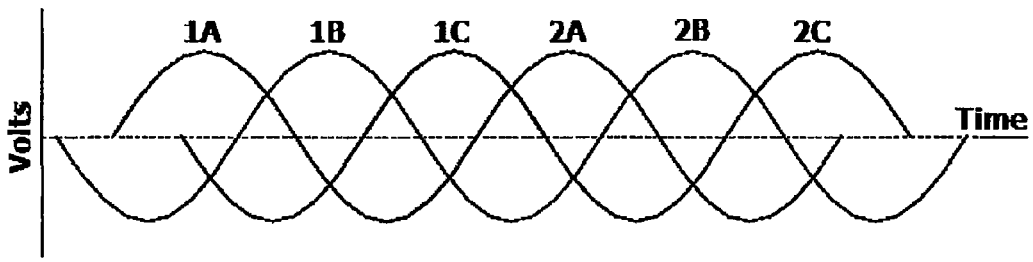
FIG. 6
| Aggregate rating of DR units (kVA) | Frequency difference (Δf, Hz) | Voltage difference (ΔV, %) | Phase angle difference (ΔΦ, °) |
|---|---|---|---|
| 0 – 500 | 0.3 | 10 | 20 |
| > 500 – 1 500 | 0.2 | 5 | 15 |
| > 1 500 – 10 000 | 0.1 | 3 | 10 |
FIG. 7
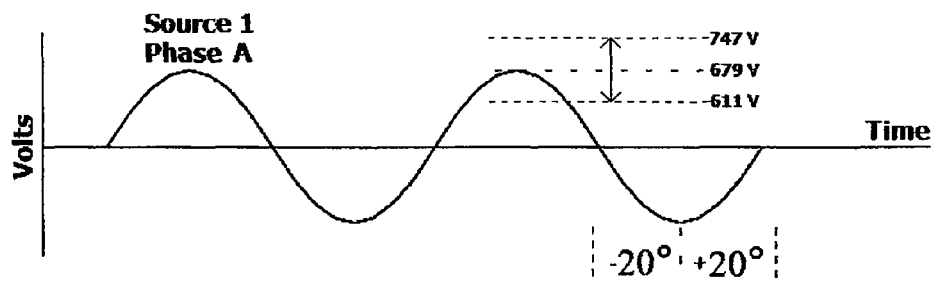
FIG. 8

MICRO SCALE FISCHER-TROPSCH AND OXYGENATE SYNTHESIS PROCESS STARTUP UNIT

FEDERALLY SPONSORED RESEARCH

Not applicable.

REFERENCE TO MICROFICHE APPENDIX

Not applicable.

FIELD OF THE INVENTION

This invention relates to equipment for starting up operations of a portable, small, or micro, scale Fischer-Tropsch ("FT") and/or oxygenate synthesis unit for producing FT liquids an/or oxygenates from synthesis gases using natural gas, biomass, coal, or other carbon-containing compound as initial feedstocks.

BACKGROUND OF THE INVENTION

Synthesis gas (or "syngas") is a mixture of primarily hydrogen and carbon monoxide, commonly with carbon dioxide, methane, water, nitrogen, and possibly other constituents such as argon or helium. Syngas can be produced from any carbon containing feedstock, including natural gas, heavy petroleum cuts such as resid or coke, bitumen, coal, or biomass by a variety of processes. Natural gas may be converted to synthesis gas using steam methane reforming ("SMR"), carbon dioxide reforming ("dry reforming"), or a combination of these two processes, or by processes employing air, enriched air, or oxygen (generally with some steam addition) such as combined reforming, autothermal reforming ("ATR"), catalytic partial oxidation ("CPOX") or thermal partial oxidation ("POX"). When employed, enriched air or oxygen may be produced by conventional cryogenic air separation, pressure swing adsorption ("PSA") or membrane processes, the use of ion transport membranes ("ITM") or any other method producing a gas containing sufficient oxygen. Heavier liquids or solids, such as petroleum cuts and/or coal, are typically converted to synthesis gas by processes employing air, enriched air, or oxygen such as gasification and catalytic/thermal partial oxidation, again typically with some steam addition to the reaction mixture. Numerous synthesis gas production processes are well known in the art.

Liquid hydrocarbon products and oxygenates may be produced from synthesis gas using any of a number of known processes. The liquid hydrocarbon products are referred to herein as "synthetic crude." As used herein, the term oxygenate means any of (1) ethers, including, for example, ethyl tert-butyl ether (ETBE), diisopropyl ether (DIPE), dimethyl ether (DME), methyl tert-butyl ether (MTBE), tert-amyl ethyl ether (TAEE), tert-amyl methyl ether (TAME); and (2) methanol and $C_{2+}$ alcohols, including for example, ethanol (EtOH), propanol, butanol, tert-amyl alcohol (TAA), and tert-butyl alcohol (TBA). Methanol is the most common oxygenated product synthesized from syngas.

Small and micro scale processes, including processes utilizing certain portable equipment, are described in detail in U.S. application Ser. No. 12/040,500 filed on Feb. 29, 2008, entitled "Fischer-Tropsch and Oxygenate Synthesis Catalyst Activation/Regeneration in a Micro Scale Process," the disclosure of which is incorporated by reference herein in its entirety.

Conventional Plant Start-Up Configuration

For a fixed-location land-based synthesis gas conversion plant (i.e., >500 bbl/day), there are a limited number of possibilities for performing FT or oxygenate synthesis plant start-ups. At one end of the spectrum, the plant is permanently connected to a large(r) electrical grid system, whereby at least some external (to the plant) electrical power is available at essentially all times. In this configuration, operation of all necessary start-up facilities and/or utilities (including, for example, the plant monitoring and control system, distilled and/or reverse osmosis water systems, inert gas generation, and/or start-up boilers) can be powered from external sources of electric power, e.g., a local power grid.

At the other end of the spectrum, for example in a completely remote plant site, stand alone, natural gas and/or liquid fuel (e.g., diesel) start-up generators are typically provided to power all necessary start-up facilities and/or utilities. Because such facilities will generally require a number of on-site workers, there are a number of additional systems, such as lighting, heating/vacuum/air conditioning (HVAC), potable water, sanitary sewers, computers, and communications, that must also be maintained in operation. Consequently, some source of electrical power must be continuously provided in such remote plant sites.

There are, of course, a number of conceivable intermediate configurations between these extremes. For example, a small natural gas and/or liquid fuel generator could be provided with sufficient output to power a start-up steam boiler and the boiler's control system. Once the boiler system and an associated steam turbine electrical generator are in operation, the remainder of the plant systems can be started up, utilizing the power from the steam turbine electrical generator. A natural gas fired turbine and/or micro-turbine electrical generator may be employed in a nearly identical way.

Regardless of the initial source of start-up power, all known synthesis gas-based FT and/or oxygenate synthesis processes produce large quantities of excess heat, particularly in the syngas generation and FT/oxygenate synthesis steps. Even for steam methane reforming generation of synthesis gas—which is typically known as an endothermic reaction—there is a great deal of excess energy in the combustion fuel gas stream which is used to supply the SMR reaction heat. The exothermic energy of syngas generation and liquid hydrocarbon and/or oxygenate synthesis is typically captured and employed to provide electrical and/or mechanical power for an entire plant during normal operations through the use of steam and/or other heat transfer medium such as hot oil.

Steam may be directly employed as both a heating medium and source of rotating equipment shaft energy (i.e., steam turbine driven compressors), while electrical power generation may include both steam- and (external feed and/or tail) gas-turbine generators. In some instances, there may be significant excess exothermic energy available after providing all required plant power, so that in non-remote locations or in more remote locations where a local external electric grid exists overall plant/project economics may be greatly improved through electrical power sales.

Movable Plant Start-Up Configuration

For currently-proposed movable, predominantly offshore, plants practical options for the plant start-up power supply are generally limited to local power generation. Therefore, such synthesis plants are generally provided with start-up power generation facilities in the same manner as a completely isolated, land-based synthesis plant would be. An off-shore synthesis plant as part of a larger facility such as an oil production platform, barge, or ship, would typically be able to employ the larger facility's local electrical power grid.

Small or micro scale liquid hydrocarbon and/or oxygenate synthesis units, however, may not, in some instances, be able to support the economics of providing complete start-up power generation equipment dedicated solely to the small or micro scale unit.

SUMMARY OF THE INVENTION

An embodiment of the invention provides a process for starting-up a liquid hydrocarbons and/or oxygenate synthesis plant, the process including the steps of supplying a portable electrical generation system to a liquid hydrocarbons and/or oxygenate synthesis plant; connecting the portable electrical generation system to a power load of the synthesis plant; using electrical power from the portable electrical generation systems to start up a liquid hydrocarbons and/or oxygenate synthesis process; generating electricity from exothermic energy generated in the liquid hydrocarbons and/or oxygenate synthesis process; synchronizing the electrical power generated by the portable electrical generation system and the electrical power generated by the exothermic energy; connecting the electrical power generated from the exothermic energy to the power load of the synthesis plant; and disconnecting the portable electrical generation system from the synthesis plant. In some embodiments, synchronizing includes measuring one or more electrical parameters of the electrical power generated by the portable electrical generation system; measuring one or more electrical parameters of the electrical power generated from the exothermic energy of the synthesis process; adjusting the one or more electrical parameters of the electrical power generated from the exothermic energy to match within preset tolerances the one or more electrical parameters of the electrical power generated by the portable electrical generation system. In some embodiments, one or more electrical parameters are selected from the group of voltage, phase angle, and frequency. In some embodiments, one or more electrical parameters is voltage. In some embodiments, the step of connecting the electrical power generated from the exothermic energy of the synthesis process to the power load of the synthesis plant further includes simultaneously connecting the electrical power generated from the exothermic energy to the portable electrical power generation system.

Another embodiment of the invention provides a system for providing start-up power to a liquid hydrocarbons and/or oxygenate synthesis plant including: a portable gas or liquid feed electrical generator; a steam turbine; a plant generator mechanically coupled to the steam turbine; a plant power load; and means for synchronizing electrical power generated by the portable electrical generator and electrical power generated by the plant generator, wherein the portable electrical generator and plant generator are electrically couplable with the plant power load. In some embodiments, the system also includes a means for measuring one or more electrical parameters of the electrical power generated by the portable electrical generator and/or the electrical power generated by the plant generator. In other embodiments, the system also includes switch means for connecting and disconnecting the portable electrical generator and/or plant electrical generator to the plant power load. In other embodiments, the system also includes a control device capable of receiving signals from the means for measuring one or more electrical parameters and capable of changing the switch means between open and closed positions. In some embodiments, one or more electrical parameters are voltage, phase angle and frequency. In other embodiments, one or more electrical parameters is voltage.

In some embodiments, the switch means may be a first connection device capable of connecting and disconnecting a first electrical power flow generated by the portable electrical generator with the plant power load and a second connection device capable of connecting and disconnecting a second electrical power flow generated by the plant generator with the plant power load. In some embodiments, the control device is further capable of measuring a first electrical power flow generated by the portable electrical generator and flowing through the first connection device. In other embodiments, the control device is further capable of comparing the first electrical power flow to a preset threshold value and determining whether the first electrical power flow is below the preset threshold value. In still other embodiments, the control device is further capable of measuring a second electrical power flow generated by the plant generator and flowing through the second connection device. In some alternative embodiments, the control device is further capable of comparing the second electrical power flow to a preset threshold value and determining whether the second electrical power flow is below the preset threshold value. In some embodiments, the control device is further capable of causing said second power flow to increase at a predetermined rate or capable of detecting problems with the plant generator. In an alternate embodiment, the system may include one or more non-powered temperature dependent drain valves, a structure enclosing liquid hydrocarbons and/or oxygenate synthesis plant or a heating system to provide heat to the structure. In some embodiments, the liquid hydrocarbons and/or oxygenate synthesis plant is a hydrogenative pre-reformer. In alternate embodiments, the system includes a large capacity power source, which is electrically couplable with the plant power load, and the means for synchronizing electrical power generated by the portable electrical generator and electrical power generated by the plant generator is also a means for synchronizing electrical power generated by the large capacity power source and electrical power generated by the plant generator. In some embodiments, the control device is further capable of detecting problems with the large capacity power source.

BRIEF DESCRIPTION OF THE DRAWINGS

FIG. 5 illustrates signals for which the frequency and voltages match but between which a phase angle difference exists.

FIG. 6 illustrates the waveforms of two perfectly synchronized 3-phase AC sources.

FIG. 7 is a table illustrating the threshhold tolerances for synchronizing a generator power source with a local grid in accordance with IEEE 1547.

FIG. 8 illustrates suitable voltage and phase-angle windows in accordance with IEEE 1547.

DETAILED DESCRIPTION OF THE INVENTION

Micro-Scale FT and Oxygenate Synthesis Plants

Figure 1:
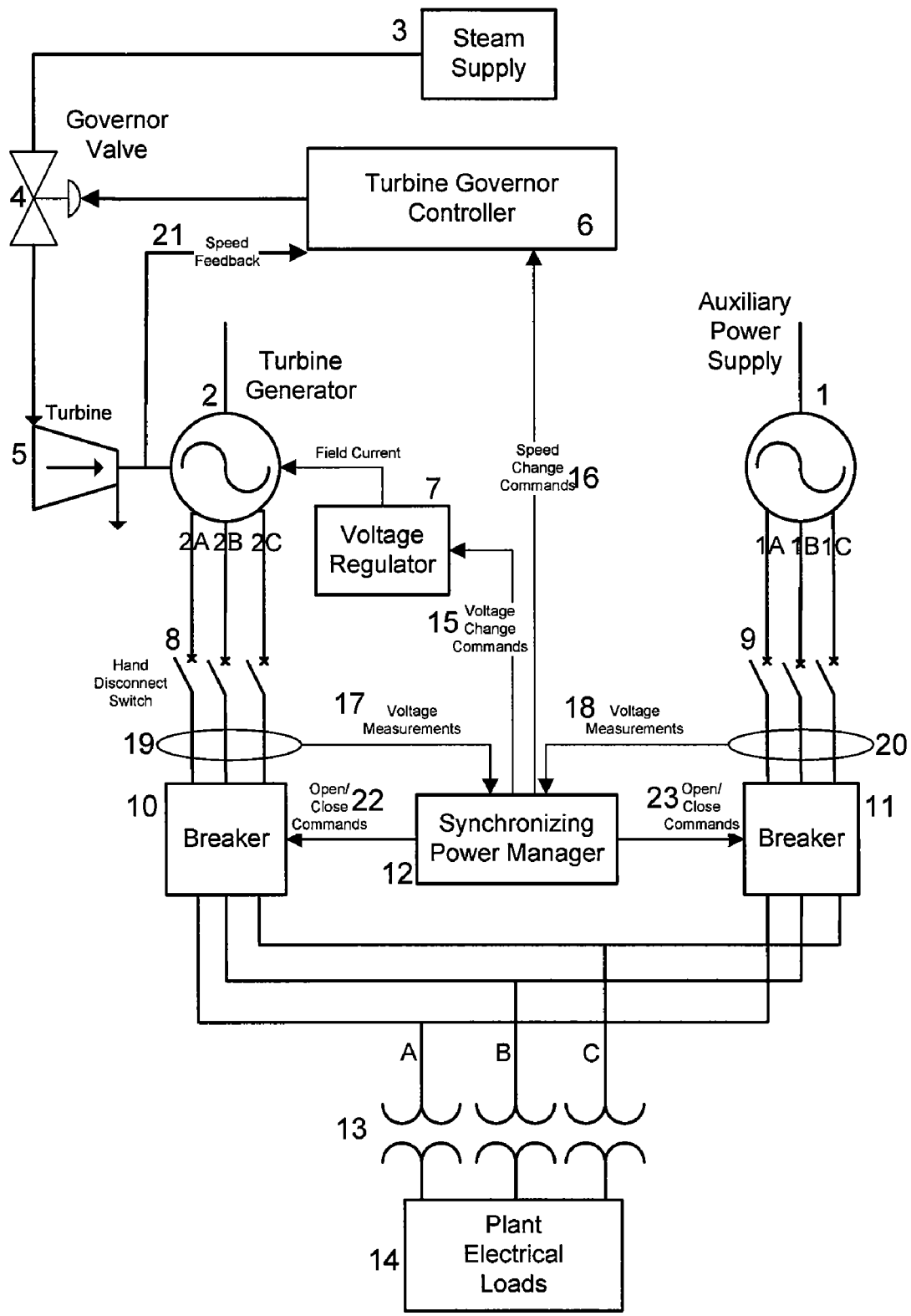
FIG. 1 is a schematic showing the hardware topology for paralleling sources in a first embodiment of the invention.

There are proposed micro-scale FT and oxygenate synthesis plants. In general, such plant capacities range from: (1) from about of 500 to about 1000 Mscfd natural gas feed rates, which are equivalent to from about 30 to about 100 bbl/day hydrocarbon liquids production capacity; or (2) about 1 to about 10 MMscfd, which are equivalent to from about 70 to about 1,000 bbl/day hydrocarbon liquids production capacity. There is in principle no reason that technically viable units could not be smaller still, in the range of 100-500 Mscfd (ca. 10-50 bbl/day); minimum size is strictly a function of economic viability.

There are a number of constraints on the economic viability of plants at this micro-scale. The most recent commercial conventional GTL plants actually constructed cost in the range of $950 million for 34,000 bbl/day FT liquid, or about $28,000 per bbl/day capacity. More recently engineering, procurement, and construction ("EPC") costs have increased such that currently forecasted GTL capital costs for plants to be constructed in the near future are in the range of $50,000 per bbl/day for similarly sized conventional plants. As plant size is increased from $S_1$ to $S_2$, the ratio of costs increases nonlinearly, i.e., by some power other than 1. For example, consider two conventional facilities having different capacities, $S_1$ and $S_2$. The cost of the second facility ($C_2$) may be determined using a "scale factor" and the cost of the first facility ($C_1$), according to the formula, $C_2 = C_1 * (S_2/S_1)^n$, where "n" is the scale factor. For n<1, costs rise at less than the ratio of plant size/capacity, so unit cost decreases yielding what is referred to as "economies of scale". At a conventional plant scale factor of 0.6 these cost projections suggest that a 50-100 bbl/day unit would cost in the range of $19-29 million (at $28,000 per bbl/day for the larger, conventional unit) to $34-51 million (at $50,000 per bbl/day). Using the more recent specific capital cost prediction of $50,000 per bbl/day capacity, and assuming a $50/bbl product price, the ratio of plant capital cost to total plant yearly revenue would vary from about 3.0 for a 34,000 bbl/day plant to 31 at 100 bbl/day and 40 at 50 bbl/day. Even with zero costs for operating and maintenance (all revenue is profit) the time to payback initial investment on such micro-scale plants would clearly be longer than the typical plant lifespan of 20-30 years. With the same $50/bbl product value assumption, actual total yearly revenues for these micro-scale 50-100 bbl/day plants would range from about $850,000 to $1,600,000. Thus, to achieve economic feasibility, plant capital investment costs for these micro-scale plants must be significantly lower than the values predicted from large plant configurations, approaching a factor of 10 (or more) times lower, and annual total operating and maintenance costs must be much lower than the relatively small total annual revenue stream.

To achieve these economic targets, certain changes to conventional plants are required. On the capital cost side, the process may be simplified, with the number of unit operations minimized. The number of vessels, instruments, and rotating equipment should be minimized. Plants are preferably not individually designed and engineered, but rather are engineered as a small number of standard designs that may be mass produced. The units may be shop fabricated, modular, and fit within normal truck bed shipping size constraints, e.g., 8 ft.×10 ft.×40 ft., and less than about 20 tons total weight. Alternatively, a single processing unit may be shop fabricated in more than one module, depending on targeted capacity. For the very exothermic syngas generation and FT/oxygenate synthesis processes, heat exchanger size may be minimized, utilizing, for example, advanced finned tube designs. In some instances, utilities that are absolutely required (typically electrical power and boiler feed water/steam systems) may be applied as widely as possible, minimizing the number of different utilities included in the plant package.

In some embodiments of the invention, the syngas production includes use of a hydrogenative pre-reformer. Pre-reformers for use in syngas generation are described in detail in U.S. application Ser. No. 12/061,355, filed on Apr. 2, 2008, entitled "Hydrogenating Pre-Reformer in Synthesis Gas Production Processes," the disclosure of which is incorporated in its entirety herein by reference.

Operating costs may also be subject to similar constraints. In some instances, the plants may be highly, if not completely, automated. In other instances, the automated control systems may be capable of remote monitoring and control. In some instances, feed costs may be minimized, by use, for example, of stranded and/or non-pipeline standard (sub-quality) natural gas, most types of coal, and/or waste-stream biomass (including but not limited to, poultry litter, sawmill wastes, agricultural residues, (Kraft paper process) black liquor, municipal solid waste).

Maintenance frequency and costs may also be minimized by judicious equipment selection and process design and layout. In some instances, connections are welded (to avoid leaks associated with gaskets and fittings) except where maintenance constraints dictate flanges or other non-welded connections. Small-scale materials of construction considerations will typically lead to "alloying up" to FeCr (or higher) alloys, compared to the more common large plant carbon steels.

It will be apparent to one of ordinary skill in the art that the foregoing embodiments of the invention may be practiced in connection with processes that produce: (1) only Fischer-Tropsch products; (2) only oxygenate products; or (3) a combination of Fischer-Tropsch and oxygenate products, and particularly Fischer-Tropsch products and methanol.

Start-Up of Micro-Scale FT and Oxygenate Synthesis Plants

The start-up power requirements for micro-scale FT and/or oxygenate synthesis processes are similar to, though typically simpler than, those required for larger scale offshore/mobile and/or land-based plants described above. This is primarily due to the absence of operation staff, such that lighting, HVAC, potable water, and sanitary sewers systems need not be maintained at all times, and actually may not be required at all. Some external source of electricity for control system and at least minimal equipment operation will still be necessary for plant start-up.

In some micro-scale "stranded gas" locations—such as oil production facilities with associated gas—as well as many micro-scale biomass/waste locations, some type of electrical grid will typically be present or easily available. In these cases micro-scale unit start-ups would proceed much like those for larger plants with access to an external grid discussed above, although there will be different considerations with regard to the power switching equipments and methods (described in more detail below).

For micro-scale GTL units in truly remote locations—particularly in the absence of any external electrical power grid—providing for unit start-up power is more problematic. While suitably sized power generation equipment such as (natural gas fueled) micro-turbine generators, as well as natural gas and/or liquid fueled combustion generators are commercially readily available, the size and cost of these units severely debits the economics of the micro-scale GTL process, particularly if these generators were only employed for unit start-ups.

As in the case of larger synthesis gas based FT and/or oxygenate synthesis processes, micro-scale units produce large amounts of "excess" heat from the exothermic syngas generation and FT and/or oxygenate synthesis processes. One obvious possibility is to capture this energy to provide unit power during plant operations. In general some type of steam system will be required to provide feed steam for the synthesis gas generation process, and as it is economically advantageous to minimize the number of micro-scale unit utilities, the wider use of steam is generally beneficial. This would typically include, for example, steam generation by cooling the hot synthesis gas product and/or by cooling, removing heat from, and/or temperature control of the FT and/or oxygenate synthesis reactors, as well as providing energy for various heater duties and powering a steam turbine electrical generator. This electrical power would, in turn, be employed driving various mechanical devices such as pumps, compressors, and fans, as well as powering all plant electronics and electrical systems. Excess steam (left over after all heating and power generation duties) would be condensed, typically in against air in air-fin heat exchangers, but the quantity of excess steam would be relatively small in a judiciously designed unit. This configuration would maximize unit efficiency, particularly if at least some portion of the FT and/or oxygenate synthesis process tail gas was combusted to produce additional steam. However, it would, in general, be impossible to start this unit up "as is" (i.e. without some additional start-up equipment).

At the other extreme, we could envision a unit where all required power for both start-up and normal operations is provided by a fueled generator. This generator could be powered by a natural gas (NG) micro-turbine or a NG or liquid fuel combustion engine. While this configuration could be readily started up and operated, there are a number of very significant, mainly economic, debits against it.

Total micro-GTL power requirements are—of course—a function of both detailed process design and power generation hardware. Consider a micro-scale unit feeding 500,000 standard cubic feed per day (500 kscfd) of natural gas (NG). Assuming a typical heat content of 1,200 BTU per standard cubic foot (SCF), this feed would represent an energy content of 600 million BTU/day, or just over 24 million BTU/hr, which is about 7.3 million watts. The electrical power requirements for a typical FT and/or oxygenate synthesis unit of this scale would be expected to be between 100 and 200 kilovolt-amps (KVA), or about 85 to 170 kilowatts (KW). The efficiency of a relatively simple combustion or turbine electrical generator, especially one not including heat recovery steam generation (HRSG), is typically in the range of 30-35%, and in no case exceeds 40%. Assuming a typical efficiency of 25% for small unit power generation, producing 85-170 KW from feed NG combustion would consume 340-680 KW of NG, or 4.5 to about 9.0% of the total unit feed.

At a conventional large plant scale the typical thermal efficiency of gas-to-liquid processes range from perhaps 50-60% for FT based processes to 60-70% for methanol production. At the much smaller micro-GTL scale thermal efficiencies are expected to be somewhat lower, in the range of 40-50% for FT and 50-60% for methanol. A 4.5 to 9% decrease in feed natural gas (to account for gas consumption in power generation) would therefore be expected to result in about a factor of 2 larger percentage decrease in liquid production (ca. 10-20%), and therefore total potential revenue.

At the same time, the excess energy produced in the process—that would otherwise be consumed in power generation—must instead be rejected elsewhere, typically by condensing steam. This results in a very large increase in heat exchanger/condenser sizes and power consumption. The economics of this micro-GTL plant configuration are clearly less than ideal.

Finally it would also be necessary to ensure that the air intake of the ICE never contains flammable gases, a not insignificant challenge given the overall small size of the entire micro-GTL unit.

An intermediate case would be combining the first option—normal plant power produced by harnessing the exothermic heat of reaction from the syngas generation and liquid hydrocarbon and/or oxygenate synthesis processes—with a smaller, gas or liquid fueled generator for plant start-up purposes only. This option would not result in the very large efficiency debits described above, but would result in "extra" equipment in the micro-GTL plant. Because the start-up generator would be only perhaps 25-35% of the capacity of the larger, steady-state operation generator, it's cost would be relatively small, in the range of only about 1-2% of the total unit capital cost, especially for internal combustion engine (ICE) generators. Natural gas, gasoline, or diesel ICE generators are available; for micro-GTL natural gas fueled machines are preferred. Natural gas fueled micro-turbine generators, which might be considered alternative possibilities, are typically in the range of 4-8 times as expensive, and can probably be ruled out of this service on capital cost alone.

The effectiveness of installing a smaller start-up generator is critically dependent on achieving truly unattended start-up capability of the micro-GTL unit. In order to be economic in the first place the micro-GTL unit must be designed for more or less completely unattended operations, as the total plant revenue stream is broadly equivalent to the costs associated with full time staffing. However, as soon as the start-up process/procedure requires on site staffing—which is generally the case—the preferred solution will be shifted to the start-up operator(s) bringing the start-up generator out with them, typically as a truck- or skid-mounted unit. There are also potential problems associated with remotely starting up a start-up generator incorporated in the micro-GTL unit in the event of a unit shutdown/trip (which will terminate the steady state power generation and possibly the unit control system if separate back-up power for this system is not included). This "black start" requirement might then entail the addition of battery back-up power, at some non-trivial additional cost, weight, and size.

A related configuration employing only installed battery back-up power—including significant investment for DC-AC inverter equipment—for start-up can generally be ruled out on cost and effectiveness terms. Providing power for one start-up will typically cost in the range of 2-3 times as much as a similarly sized ICE generator. But start-up procedures/processes are themselves subject to unexpected shutdowns and trips (especially during periods immediately following a previous unit shutdown/trip), and if a shutdown occurs prior to establishing operation of the unit power generation equipment and sufficient time to recharge the batteries, the latter will be completed drained prior to establishing normal operations. This potential problem can be mitigated to some extent by oversizing the battery back-up system, but is still vulnerable to complete battery discharge in extended or multi-trip start-ups. Size and weight of the required battery back-up system are also a significant debit in a micro-GTL unit.

The preferred embodiment of the current invention employs a steam turbine generator for electrical power production during normal plant operations, as described above. Start-up and controlled shutdown power is provided by either an electrical grid, if available, or, more commonly, a portable, truck mounted gas or liquid fueled generator in the absence of a grid. In order to start-up the unit following a shutdown—either controlled or emergent—operations/start-up personnel would bring the start-up unit to the remote facility and perform the start-up procedure, after which such personnel and the equipment needed to supply electrical power for start-up depart.

Another preferred embodiment of the current invention in the absence of a local power grid also employs a very low capacity (typically 5-10 kW) solar power generator and battery back-up system to maintain operations of the microGTL control and monitoring systems when the unit is not operating. At a minimum such a back-up system is required to differentiate a true unit shutdown—and hence loss of data transfer to a separate/remote monitoring facility—from a loss of communication from an otherwise operating unit. The control and monitoring system preferably consist of a programmable logic controller (PLC) and a supervisory control and data acquisition (SCADA) system, although other hardware systems and types are known.

Where a portable electrical power supply is used for start-up of a plant, it will be necessary to synchronize, or parallel, the electrical power supplied by the portable supply with the electrical power generated from the exothermic energy during the transfer from the portable power supply. Moreover, if a liquid hydrocarbon and/or oxygenate synthesis plant produces excess electrical energy beyond that needed by plant and such excess electrical energy is to be uploaded onto an external electrical grid, such excess electrical power must be synchronized with the grid power.

Synchronizing Electrical Power

Referring first to FIG. 1, the hardware required for paralleling electrical sources in accordance with a first embodiment of the invention is described. An AC source (1) is shown as a 3-phase AC electrical source that is available as a local utility or a portable gas or liquid feed generator, and generator (2) is a movable 3-phase AC generator. A steam turbine (5) is mechanically coupled to generator (2) such that the steam turbine (5) spins generator (2), thereby converting the mechanical power of the rotating steam turbine to electrical power. A governor valve (4) controls the feed from steam supply (3) to the turbine (5). The governor valve (4) is controlled by a governor controller (6). The governor controller (6) has an internal speed setpoint for the turbine (5). The governor controller (6) receives speed feedback (21) from turbine (5) and compares it to the internal speed setpoint. If there is a difference between the internal speed setpoint and the speed feedback (21), governor controller (6) modifies the speed of the turbine (5) by changing the amount of steam that passes to the turbine (5) by modulating the governor valve (4).

Generator (2) outputs 3 phases of electricity 2A, 2B, and 2C, which can be connected to a Fischer-Tropsch and/or oxygenate synthesis unit (14) via circuit breaker (10) by manually closing first disconnect switch 8. In some embodiments, disconnect switch 8 will only be opened for maintenance. The voltage level of each of phases 2A, 2B, and 2C may be controlled by voltage regulator (7). The voltage regulator controls the voltage of each of the three phases by changing the excitation current through the rotor coil as needed to maintain the desired phase voltage. In the absence of loads or in the case of balanced loads, the three phase voltages will all be the same.

Source (1) passes through the second disconnect switch (9) and connects to the primary side of circuit breaker (11). In general operation circuit breaker (11) is closed and source (1) is connected to a transformer (13), which feeds the electrical loads (14) of the plant. Second disconnect switch (9) may be opened (and the circuit interrupted) as needed, e.g., for maintenance.

Figure 2:
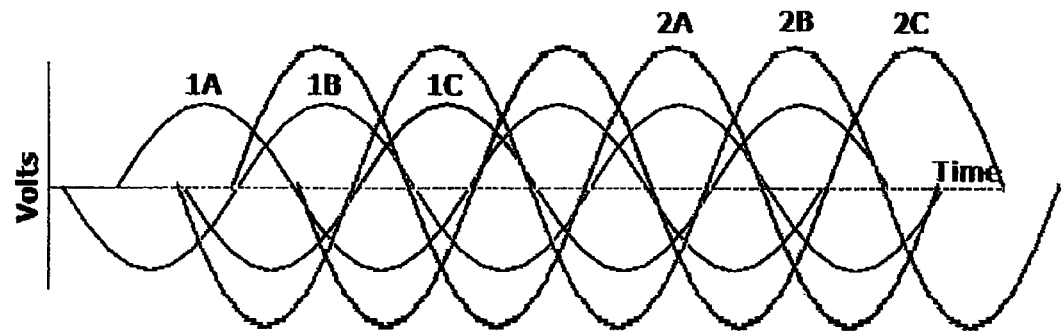
FIG. 2 illustrates two separate unsynchronized 3-phase sources.

In some embodiments, synchronizing power manager (12) receives voltage measurements (17) of the output of generator (2) from potential transformers (19). Synchronizing power manager (12) also receives voltage measurements (18) of source (1) from potential transformers (20). In a preferred embodiment, voltage measurements (18) of source (1) serve as the reference for what voltage measurements (17) of generator (2) should be. From the point of view of synchronizing power manager (12), the voltage measurements (17) and (18) appear as in FIG. 2.

Figure 3:
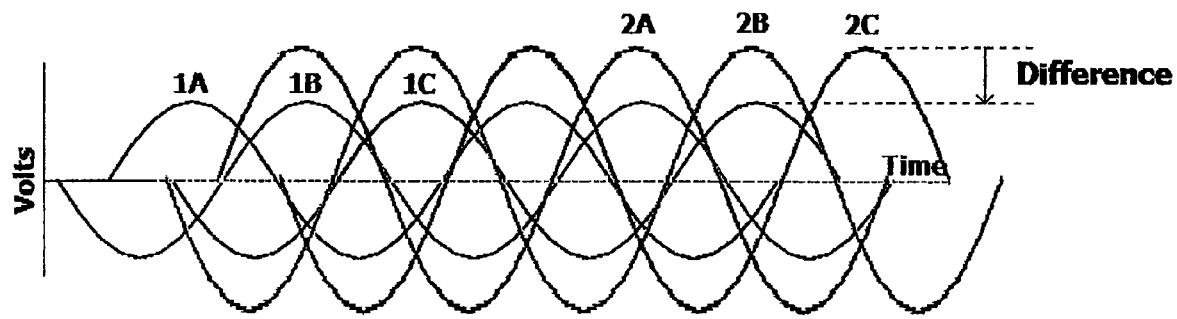
FIG. 3 illustrates the voltage difference between sources requiring adjustment.

If synchronizing power manager (12) recognizes a difference between voltage measurements (17) and (18), as shown FIG. 3, synchronizing power manager (12) instructs voltage regulator (7) to manipulate the voltages levels of phases 2A, 2B, and 2C until the voltages in measurements (17) and (18) match to within a preset tolerance.

Figure 4:
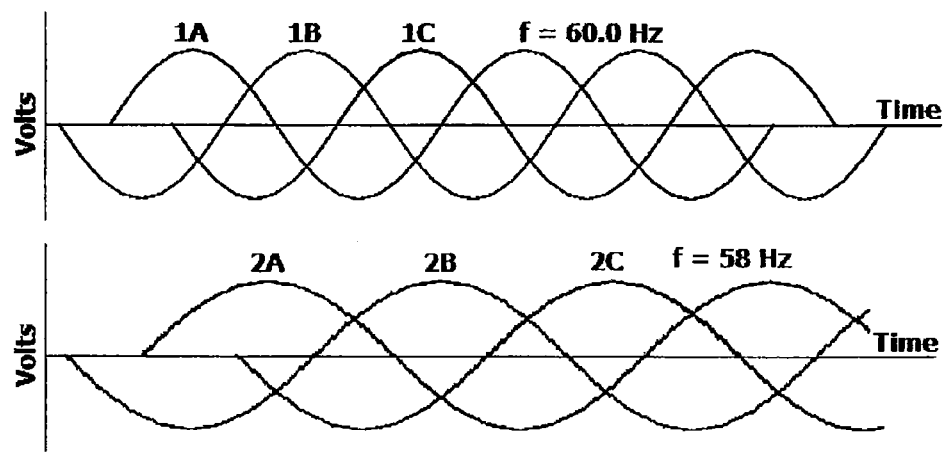
FIG. 4 illustrates two 3-Phase AC sources of different frequencies illustrated as not overlapping.

If synchronizing power manager (12) recognizes a difference between the frequencies of measurements (17) and (18), as shown in FIG. 4, synchronizing power manager (12) sends change of speed commands (16) to governor controller (6) until the frequencies in measurements (17) and (18) match to within a preset tolerance. Governor controller (16) may then cause governor valve (4) to modulate, changing the amount of steam from steam supply (3) that is fed to and through turbine (5). Such change in the amount of steam causes the speeds of turbine (5) and generator (2) to change. By altering the speed of generator (2), the frequency of the generator output phase 2A, 2B, and 2C are changed.

If the voltages of measurements (17) and (18) are the same, (a frequency difference in measurements (17) and (18) of zero), and the phase angles of measurements (17) and (18) (as shown in FIG. 5), are different; synchronizing power manager (12) sends a change of speed command (16) to governor controller (6). This serves to shift the waveforms of measurements (17) so that they are in phase with the waveforms of measurements (18) to within a preset tolerance.

Once the voltage, frequency, and phase angle of measurements (17) are all within present tolerances of concomitant measurements (18), synchronizing power manager (12) will recognize measurements (17) and (18) as shown in FIG. 6; i.e., as one set of 3-phase power lines. Synchronizing power manager (12) may then send close commands (22) to circuit breaker (10). After circuit breaker (10) is closed, both the output of generator (2) and source (1) will be connected in parallel to the plant electrical loads (14) through circuit breakers (10) and (11), disconnects (8) and (9), and transformer (13).

FIG. 6 represents a preferred ideal synchronization between two sources. However, in alternative embodiments, breaker (10) can be closed when the three parameters, voltage, frequency, and phase angle, of the generator (2) output are within a preset threshhold tolerance of the three parameters of the source (1). IEEE 1547, Standard for Interconnecting Distributed Resources with Electric Power Systems, offers threshold tolerances for performing the synchronization. Such threshold tolerances are listed in the table of FIG. 7.

In those embodiments employing the tolerances prescribed by IEEE 1547, windows of possible voltages and phase angle differences are created about the reference waveform of Source 1, as seen in FIG. 8.

Figure 9:
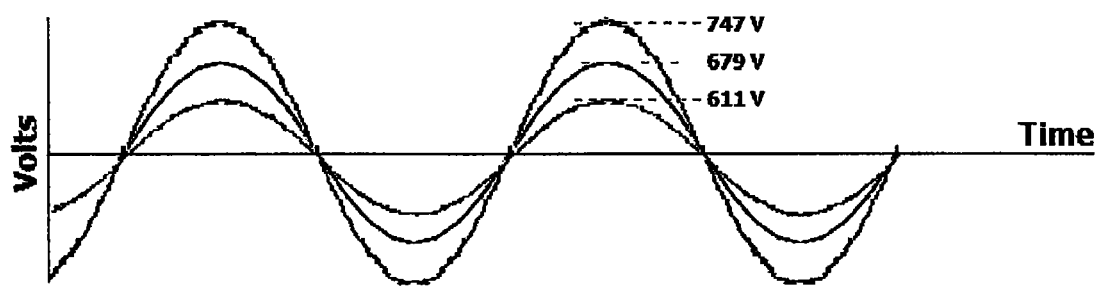
FIG. 9 illustrates suitable voltage levels for paralleling two sources in accordance with IEEE 1547.

FIG. 9 shows two potential generator (2) single phase waveforms that precisely match source (1) in frequency and phase angle, but differ in voltage within IEEE 1547 prescribed tolerances for closing circuit breaker (10).

Figure 10:
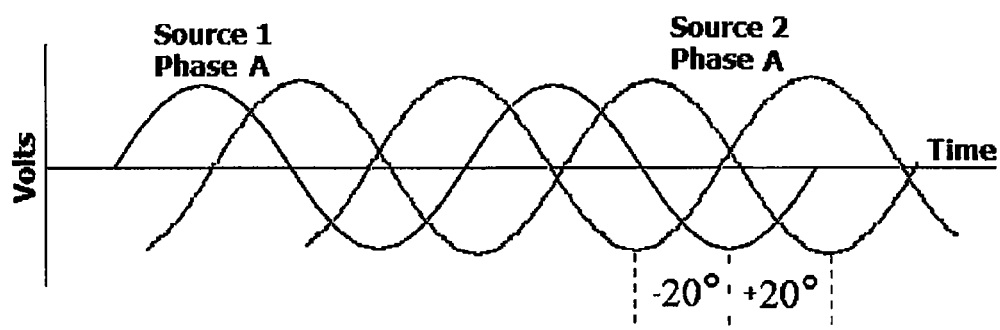
FIG. 10 illustrates suitable phase angle differences for paralleling two sources in accordance with IEEE 1547.

FIG. 10 shows two potential generator (2) single phase waveforms that precisely match source (1) in voltage and frequency, but differ in voltage within IEEE 1547 prescribed tolerances for closing circuit breaker (10).

Figure 11:
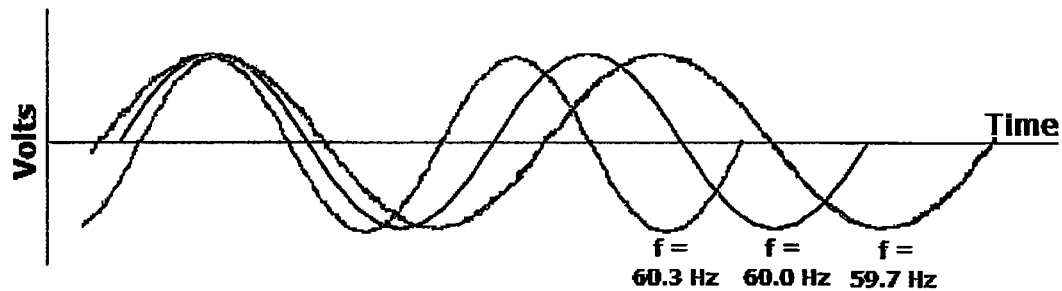
FIG. 11 illustrates suitable frequency difference for paralleling two sources in accordance with IEEE 1547.

FIG. 11 shows two potential generator (2) single phase waveforms that precisely match source (1) in voltage but differ in frequency within IEEE 1547 prescribed tolerances for closing circuit breaker (10).

For breaker (10) to close for either of the generator (2) waveforms in FIG. 11 (shown as a solid line), then there must be a continuous monitoring of the phase angle difference $\Delta\Phi$ such that the breaker close command occurs within a window of time where the $\Delta\Phi$ is within limits.

Figure 12:
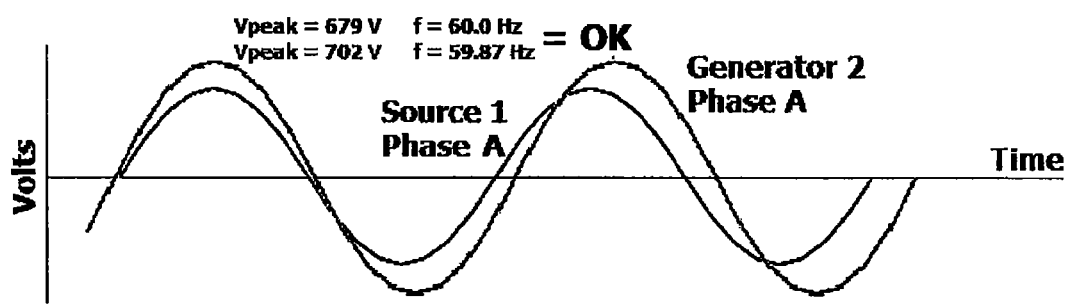
FIG. 12 illustrates example of suitable waveforms for paralleling two sources.
Figure 13:
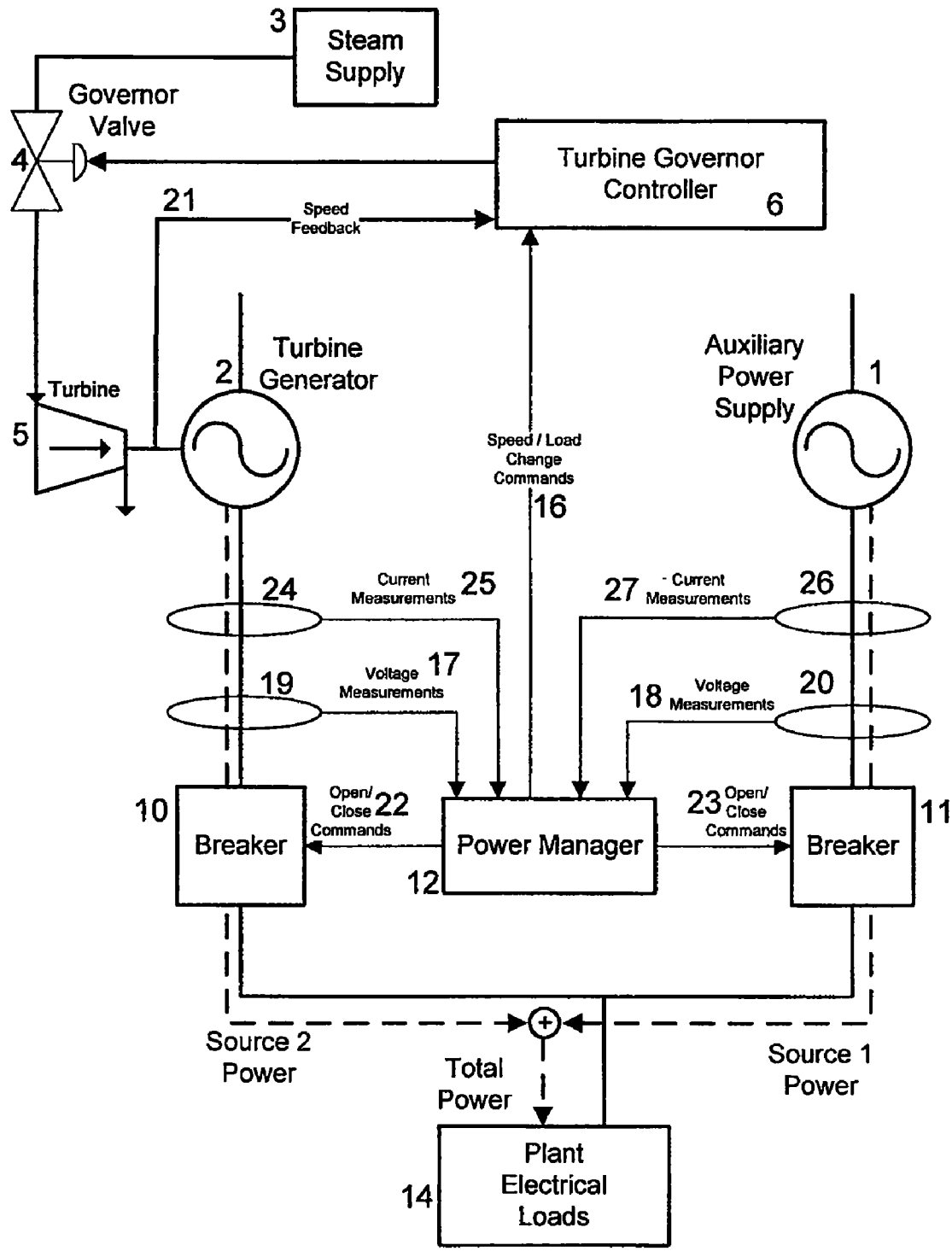
FIG. 13 illustrates power flows through paralleled systems in accordance with a preferred embodiment of the invention.

FIG. 12 shows a sample suitable waveform for paralleling the generator (2) and source (1). Although these waveforms do not overlap perfectly, all parameters are within present tolerances in the time window shown.

Once circuit breaker (10) is closed the steam turbine generator (2) and source (1) are electrically connected to each other, the phase angle difference of their voltages is necessarily 0 degrees, because there are no longer two voltages. This assumes negligible impedance of conductors and equipment between them.

Figure 15:
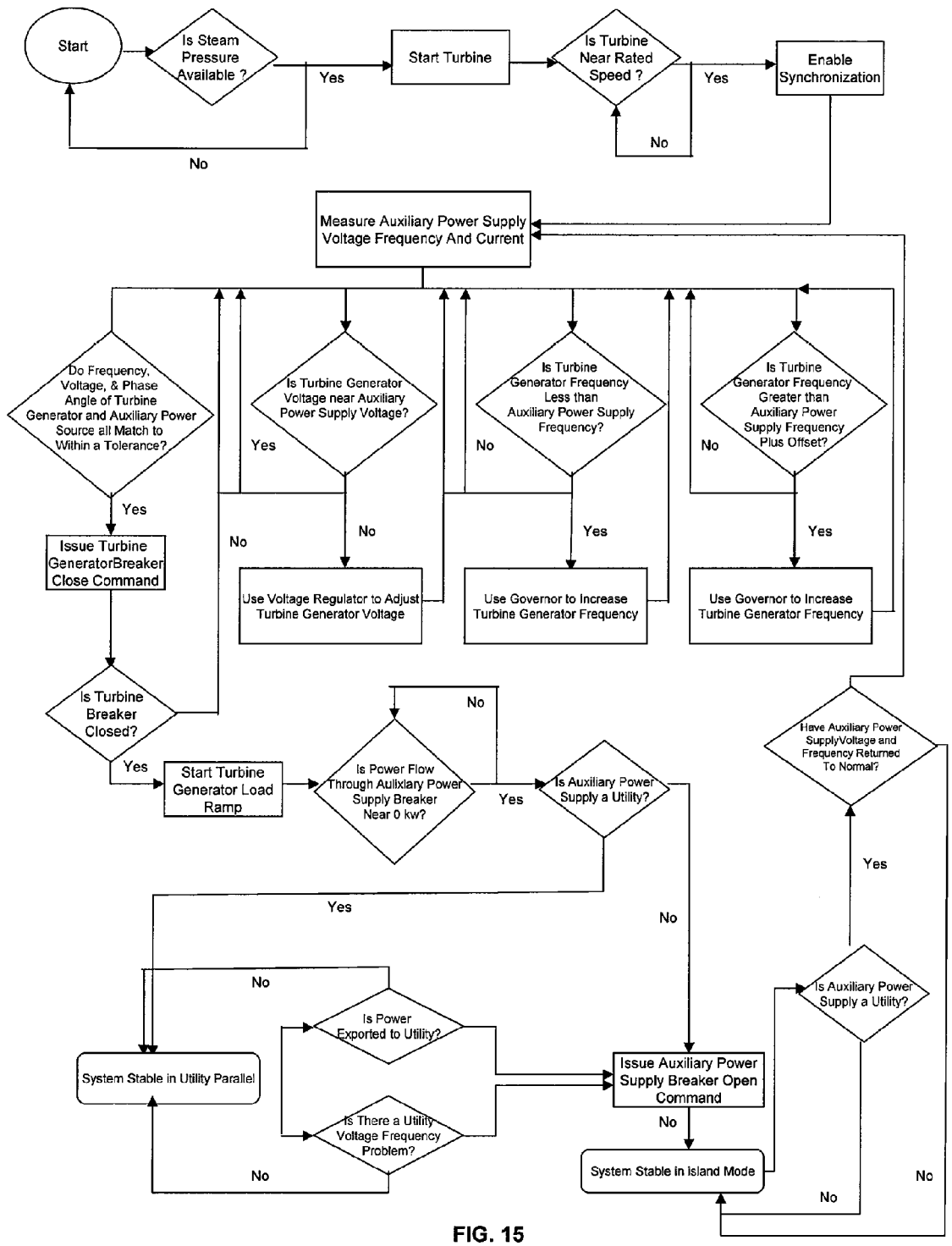
FIG. 15 illustrates the logic for system breaker control and synchronization in accordance with an embodiment of the invention.

The parallel connected systems will have power flows as shown by the lines in FIG. 15. The total power is whatever the plant system needs to run. Its magnitude is not optional or negotiable, and is decided by the process loads and control system power consumption. The synchronizing power manager (12) determines the magnitude of source 2 power, and the source 1 power is the difference between the total power and source 2 power allowed by the synchronizing power manager (12).

The synchronizing power manager (12) performs fast, reliable measurements of the power through each circuit breaker using potential transformers (19 and 20) and current transformers (24 and 26).

After the two sources are connected, the controllable parameter of the governor controller (6) is no longer the speed of the turbine. Instead the controllable parameter becomes the mechanical power delivered by the turbine (5) to the generator (2). Hence, the speed change commands (16) issued by the synchronizing power manager (12) become load change commands (16). With the load change commands (16) the synchronizing power manager (12) can control how much electrical power is delivered by the generator (2).

In some embodiments, the synchronizing power manager (12) includes an operating mode called import/export. The import/export mode controls the amount of power that is imported from or exported to whatever is upstream of circuit breaker (11). The synchronizing power manager (12) controls this amount by adjusting the other source of power, the steam turbine generator (2). If the available power from generator (2) is zero, as in when circuit breaker (10) is open (before synchronization), the synchronizing power manager (12) is smart enough to know this and it will not attempt to adjust the power delivered by the steam turbine generator (2) until circuit breaker (10) is closed.

The plant will use the import/export mode of the synchronizing power manager (12) with a setpoint of 0 kW. This means that when the synchronizing power manager (12) recognizes that circuit breaker (10) and circuit breaker (11) are both closed, the synchronizing power manager (12) will begin to attempt to make the power flow through circuit breaker (11) equal to 0 kW. It will do this by increasing the load delivered by generator (2). It will achieve that by sending load change commands (16) of the "increase load" type. Synchronizing power manager (12) will control the rate of the increase load commands as described below.

Figure 14:
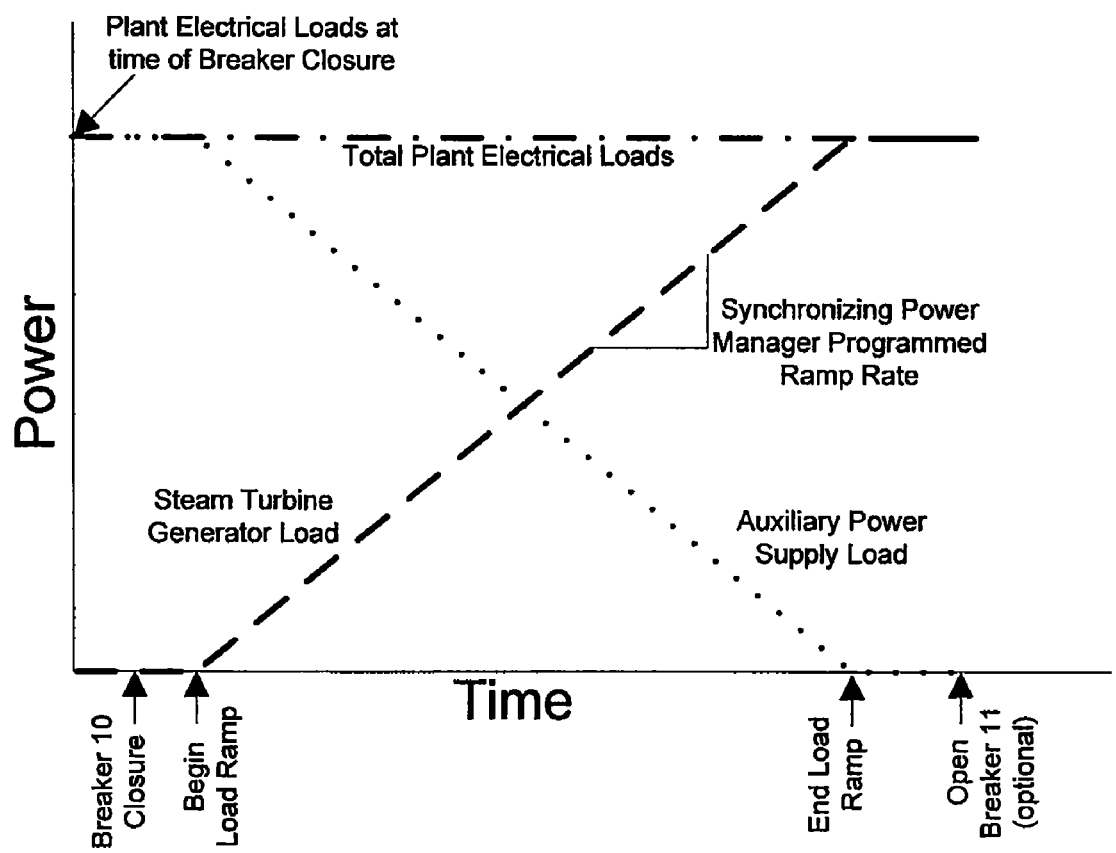
FIG. 14 illustrates power delivery load curves for equipment during a soft transfer in accordance with an embodiment of the invention.

If, during the transfer of load from source (1) to generator (2) the total power consumed by the plant loads does not change, FIG. 14 show the time-varying magnitudes of the three loads of FIG. 15 This limitation is imposed only to simplify the graph. In reality the total load can change, giving the pink line a slope.

Immediately after the synchronizing power manager (12) sends close command (22) to circuit breaker (10), circuit breaker (10) closes and source (1) and generator (2) operate in parallel. The initial load delivered by generator (2) is very small (shown as zero in FIG. 18) and after a short time, synchronizing power manager (12) uses load change commands (16) to increase the power delivered by the steam turbine generator (2). The rate at which the load is introduced to the generator (2) is a configurable parameter of synchronizing power manager (12). The ramp rate will be set to a conservative value. It is the ramp rate of load introduction to the steam turbine generator (2) that determines the increase in steam consumption, which determines the upset to the steam raising portion of the plant. As an option, we may wish to control the ramp rate is controlled with an analog input to the synchronizing power manager (12), the magnitude of the analog signal being determined by the steam raising process, for example, by a watchdog on the steam generator level.

After the ramp illustrated in FIG. 14 has completed the entire load of the plant may be supplied by the steam turbine generator (2).

In those instances in which the source (1) is an infinite grid or a plant distribution system, circuit breaker (11) may remain closed and the import/export mode for synchronizing power manager (12) may remain active. Sudden changes in load will usually be supplied by source (1). Synchronizing power manager (12) may respond by increasing the load delivered by steam turbine generator (2) bring the power flow through circuit breaker (11) back to its setpoint of 0 kW. This process provides high reliability of power flow. With the steam turbine generator (2) and the grid connected in parallel and with the electrical load being supplied completely by the steam turbine generator (2), the grid may be instantly and fully available to support the plant loads in the event of a steam turbine trip. Under normal circumstances, and in some embodiments, the power draw from the external power grid is 0 kW, such that no external power must be bought. The only times the owner pays to power the plant are during a startup and in the event of a turbine trip.

If source (1) is a standby generator, at the time that synchronizing power manager (12) recognizes that the power flow through circuit breaker (11) is below a threshold near 0 kW (e.g. 5 kW), synchronizing power manager (12) will send an open command (23) to circuit breaker (11), thereby disconnecting source (1) from the plant loads.

This embodiment offers lower power flow reliability as there is no other source of power connected in parallel to the steam turbine generator (2) that could instantly support the plant loads in the event of a turbine trip. However, when there is no other power source available due to remote location or logistics, this embodiment provides some power flow reliability.

FIG. 15 illustrates the logic for the operation of embodiments of the invention electrical system.

Shutdown Freeze Protection

A related potential problem for an economical micro-GTL unit is freeze protection during periods when the unit is not in operation. In many temperature locations there exists a real possibility of sub-freezing ambient temperatures during at least part of the year. Although an operating micro-GTL unit typically produces significant excess energy in the form of low level heat—which must be rejected into a cooling medium such as ambient air—upon shutdown all heat generation is terminated. As described above most synthesis gas production-based GTL processes will require some significant steam generating capability to provide feed steam for the synthesis gas generation process, and as a result it will be advantageous to employ steam in as many services as possible, especially for power generation—as described above—and liquid synthesis reactor temperature control/cooling. Such a water/steam system must be protected from freezing temperatures at all times, but especially when the unit is not in operation. Such a protection system must be automatic—capable of functioning in the absence of personnel—and should not require any, or any significant amount of, electrical power.

The greatest danger of freezing temperatures is equipment damage due to the expansion of water as it freezes. Water freezing in confined spaces, such as pipes, can result in burst piping, ruptured vessels, and/or severely damaged/ruined valves and instrumentation. In one embodiment, a micro-GTL unit is equipped with non-powered temperature-dependent drain valves at suitable low points on all water/steam system equipment. Such non-powered temperature dependent drain valves would contain a thermostatic element that opens at a specified temperature setpoint, typically several degrees below or above the freezing temperature of water, although local conditions may dictate somewhat higher or lower settings. Once suitably higher temperatures are detected the non-powered temperature dependent drain valves would close. This type of system alone is preferred in more temperate locations, where freezing conditions are relatively rare.

In colder climates where freezing conditions are not rare, the likelihood of sub-freezing temperatures is much greater, such that the chance of coincident freezing temperatures during a unit shutdown could be very high. In addition, in many gas producing regions (i.e. northern Alaska and Canada, as well as northern Russia/Siberia) winter temperatures may be low enough to cause potential freezing problems even during normal unit operations. In such colder locations/climates, it will normally be advantageous to enclose the entire micro-GTL in a building type structure, generally with heating means installed. This may consist of a steel structure supporting sheet metal walls and ceilings (which may be insulated if necessary) with suitable air circulation/ventilation to prevent build-up of both burner combustion products, especially $CO_2$, and combustible gases such as methane, hydrogen, carbon monoxide and liquid synthesis product vapors.

In addition, such building would typically be outfitted with a fired heating system controlled by a thermostatic sensor located inside the building. The heating system is preferably fired with natural gas from the same source as the micro-GTL unit feed. Firing is triggered and/or controlled by a thermostatic sensor located inside the structure, and is typically set very close to the freezing temperature of water thereby causing the heating system to be in operation only when there is a significant chance of freezing the water/steam system, such as when the unit was shutdown with sub-freezing ambient temperatures.

We claim:

1. A system for providing start-up power to a liquid hydrocarbons and/or oxygenate synthesis plant comprising:
    a portable gas or liquid feed electrical generator;
    a steam turbine;
    a plant generator mechanically coupled to the steam turbine;
    a plant power load;
    a circuit breaker configured to couple the portable gas or liquid feed electrical generator with the plant, wherein the portable gas or liquid feed electrical generator is configured to provide electrical power to the plant via the circuit breaker to start-up the liquid hydrocarbons and/or oxygenate synthesis plant; and
    means for synchronizing electrical power generated by the portable electrical generator and electrical power generated by the plant generator, wherein the portable electrical generator and plant generator are electrically couplable with the plant power load.

2. The system of claim 1 further comprising:
    a means for measuring one or more electrical parameters of the electrical power generated by the portable electrical generator and/or the electrical power generated by the plant generator.

3. The system of claim 2 further comprising:
    switch means for connecting and disconnecting the portable electrical generator and/or plant electrical generator to the plant power load.

4. The system of claim 3 further comprising a control device capable of receiving signals from the means for measuring one or more electrical parameters and capable of changing the switch means between open and closed positions.

5. The system of claim 2 wherein the one or more electrical parameters are voltage, phase angle and frequency.

6. The system of claim 2 wherein the one or more electrical parameters is voltage.

7. The system of claim 3 wherein the switch means comprises:
    a first connection device capable of connecting and disconnecting a first electrical power flow generated by the portable electrical generator with the plant power load; and
    a second connection device capable of connecting and disconnecting a second electrical power flow generated by the plant generator with the plant power load.

8. The system of claim 7 wherein the control device is further capable of measuring a first electrical power flow generated by the portable electrical generator and flowing through the first connection device.

9. The system of claim 8 wherein the control device is further capable of comparing the first electrical power flow to a preset threshold value and determining whether the first electrical power flow is below the preset threshold value.

10. The system of claim 7 wherein the control device is further capable of measuring a second electrical power flow generated by the plant generator and flowing through the second connection device.

11. The system of claim 8 wherein the control device is further capable of comparing the second electrical power flow to a preset threshold value and determining whether the second electrical power flow is below the preset threshold value.

12. The system of claim 7 wherein the control device is further capable of causing said second power flow to increase at a predetermined rate.

13. The system of claim 4 wherein the control device is further capable of detecting problems with the plant generator.

* * * * *